United States Patent
Liu et al.

(10) Patent No.: US 9,983,301 B2
(45) Date of Patent: May 29, 2018

(54) AUTOMATED VEHICLE RADAR SYSTEM TO DETERMINE YAW-RATE OF A TARGET VEHICLE

(71) Applicant: DELPHI TECHNOLOGIES, INC., Troy, MI (US)

(72) Inventors: Yu Liu, Cleveland, OH (US); Jan K. Schiffmann, Newbury Park, CA (US)

(73) Assignee: Delphi Technologies, Inc., Troy, MI (US)

( * ) Notice: Subject to any disclaimer, the term of this patent is extended or adjusted under 35 U.S.C. 154(b) by 448 days.

(21) Appl. No.: 14/873,815

(22) Filed: Oct. 2, 2015

(65) Prior Publication Data

US 2017/0097410 A1    Apr. 6, 2017

(51) Int. Cl.
| | |
|---|---|
| *G01S 13/42* | (2006.01) |
| *G01S 13/93* | (2006.01) |
| *G01S 13/58* | (2006.01) |
| *G01S 13/66* | (2006.01) |
| *G01S 13/60* | (2006.01) |
| *G01S 13/72* | (2006.01) |

(52) U.S. Cl.
CPC ............ *G01S 13/42* (2013.01); *G01S 13/931* (2013.01); *G01S 13/58* (2013.01); *G01S 13/60* (2013.01); *G01S 13/66* (2013.01); *G01S 13/72* (2013.01)

(58) Field of Classification Search
CPC .......... G01S 13/42; G01S 13/50; G01S 13/58; G01S 13/582; G01S 13/584; G01S 13/588; G01S 13/60; G01S 13/66; G01S 13/72; G01S 13/931
See application file for complete search history.

(56) References Cited

U.S. PATENT DOCUMENTS 3,750,174 A * 7/1973 Belluck ................... G01S 13/68
                                                         342/17
3,952,304 A * 4/1976 Broniwitz ........... G01S 13/4472
                                                         342/107

(Continued)

FOREIGN PATENT DOCUMENTS

| EP | 0 899 543 A2 | 3/1999 |
| EP | 1 418 444 A1 | 5/2004 |

(Continued)

*Primary Examiner* — Peter M Bythrow

(74) *Attorney, Agent, or Firm* — Lawrence D. Hazelton

(57) ABSTRACT

A radar system suitable for an automated vehicle includes a radar sensor and a controller. The radar-sensor is mounted on a host-vehicle. The radar-sensor is operable to detect radar-signals reflected by scattering-points of a target-vehicle located proximate to the host-vehicle. The controller is in communication with the radar-sensor. The controller is configured to determine a present-range-rate, a present-azimuth, and optionally a present-range, of each of the scattering-points at a present-time. The controller is also configured to recall a prior-range-rate, a prior-azimuth, and optionally a prior-range, of each of the scattering-points at a prior-time. The controller is also configured to calculate a yaw-rate of the target-vehicle at the present-time based on the present-range-rate, the present-azimuth, the prior-range-rate, and the prior-azimuth, and optionally the present-range and the prior-range, of each of the scattering-points.

3 Claims, 2 Drawing Sheets

(56) References Cited

U.S. PATENT DOCUMENTS

| | | | | |
|---|---|---|---|---|
| 4,148,026 A | * | 4/1979 | Gendreu | F41G 5/08 235/409 |
| 4,224,507 A | * | 9/1980 | Gendreu | G01S 13/4472 235/410 |
| 4,959,800 A | * | 9/1990 | Woolley | G01S 13/66 235/411 |
| 5,612,699 A | * | 3/1997 | Yamada | G01S 7/412 342/70 |
| 5,793,325 A | * | 8/1998 | Yamada | G01S 13/931 342/158 |
| 5,955,967 A | * | 9/1999 | Yamada | G01S 13/426 180/169 |
| 6,611,741 B2 | | 8/2003 | Michi et al. | |
| 2002/0177936 A1 | * | 11/2002 | Matsui | G01S 13/931 701/96 |
| 2003/0218563 A1 | * | 11/2003 | Miyahara | G01S 13/723 342/70 |
| 2005/0225477 A1 | * | 10/2005 | Cong | B60K 31/0008 342/70 |
| 2009/0157314 A1 | * | 6/2009 | Jordan | B60W 40/04 701/300 |
| 2011/0068970 A1 | * | 3/2011 | Mitsumoto | G01S 7/4026 342/70 |
| 2012/0101711 A1 | * | 4/2012 | Furmston | G01S 7/415 701/300 |
| 2016/0178742 A1 | * | 6/2016 | Shikatani | G01S 13/60 342/113 |
| 2016/0291143 A1 | * | 10/2016 | Cao | G01S 13/931 |

FOREIGN PATENT DOCUMENTS

| | | |
|---|---|---|
| EP | 2 590 152 A1 | 5/2013 |
| WO | 01/50154 A1 | 7/2001 |

* cited by examiner

AUTOMATED VEHICLE RADAR SYSTEM TO DETERMINE YAW-RATE OF A TARGET VEHICLE

TECHNICAL FIELD OF INVENTION

This disclosure generally relates to a radar system suitable for an automated vehicle, and more particularly relates to a system that calculates a yaw-rate of the target-vehicle based on the present and prior radar signals.

BACKGROUND OF INVENTION

When an automated or autonomous host-vehicle is preceded by a target-vehicle traveling forward of the host-vehicle, it is advantageous for the system that controls the operation (e.g. steering, brakes, engine) of the host-vehicle to have knowledge of the yaw-rate of the target vehicle. Knowledge of the yaw-rate of the target vehicle can be useful to, for example, temporarily allow a closer following distance because the target-vehicle is turning out of the travel path of the host-vehicle.

SUMMARY OF THE INVENTION

Accurate estimation of the yaw-rate and over-the-ground (OTG) velocity is important for many driving-assistance systems. Described herein is a radar system configured to estimate the yaw-rate and OTG velocity of extended targets (largely, for vehicle tracking) in real-time based on raw radar detections (i.e., range, range-rate, and azimuth). As used herein, the term 'extended-targets' is used to refer to targets that present multiple, spaced-apart scattering-points so the term 'extended-target' is understood to mean that the target has some physical size. The various scattering-points are not necessarily individually tracked from one radar scan to the next, so the number of scatter-points can be a different quantity and/or each scattering point have a different location on the extended-target in successive radar scans. While the description presented is generally directed to system configurations where a host-vehicle is equipped with a single radar sensor on the host-vehicle for tracking targets in a field of view (FOV) of the radar sensor, it is contemplated that the teachings presented herein are applicable to radar systems equipped with multiple radar sensors. Furthermore, while it is presumed that the target-vehicle is an OTG vehicle so there is no substantial z-axis motion, it is contemplated that the teachings presented herein could be applied to three-dimensional applications such as aircraft.

In accordance with one embodiment, a radar system suitable for an automated vehicle is provided. The system includes a radar sensor and a controller. The radar-sensor is mounted on a host-vehicle. The radar-sensor is operable to detect radar-signals reflected by scattering-points of a target-vehicle located proximate to the host-vehicle. The controller is in communication with the radar-sensor. The controller is configured to determine a present-range-rate and a present-azimuth of each of the scattering-points at a present-time. The controller is also configured to recall a prior-range-rate and a prior-azimuth of each of the scattering-points at a prior-time. The controller is also configured to calculate a yaw-rate of the target-vehicle at the present-time based on the present-range-rate, the present-azimuth, the prior-range-rate, and the prior-azimuth of each of the scattering-points.

In another embodiment, a radar system suitable for an automated vehicle is provided. The system includes a radar sensor and a controller. The radar-sensor is mounted on a host-vehicle. The radar-sensor is operable to detect radar-signals reflected by scattering-points of a target-vehicle located proximate to the host-vehicle. The controller is in communication with the radar-sensor. The controller is configured to determine a present-range, a present-range-rate, and a present-azimuth of each of the scattering-points at a present-time. The controller is also configured to recall a prior-range, a prior-range-rate, and a prior-azimuth of each of the scattering-points at a prior-time. The controller is also configured to calculate a yaw-rate of the target-vehicle at the present-time based on the present-range, the present-range-rate, the present-azimuth, the prior-range, the prior-range-rate, and the prior-azimuth of each of the scattering-points.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
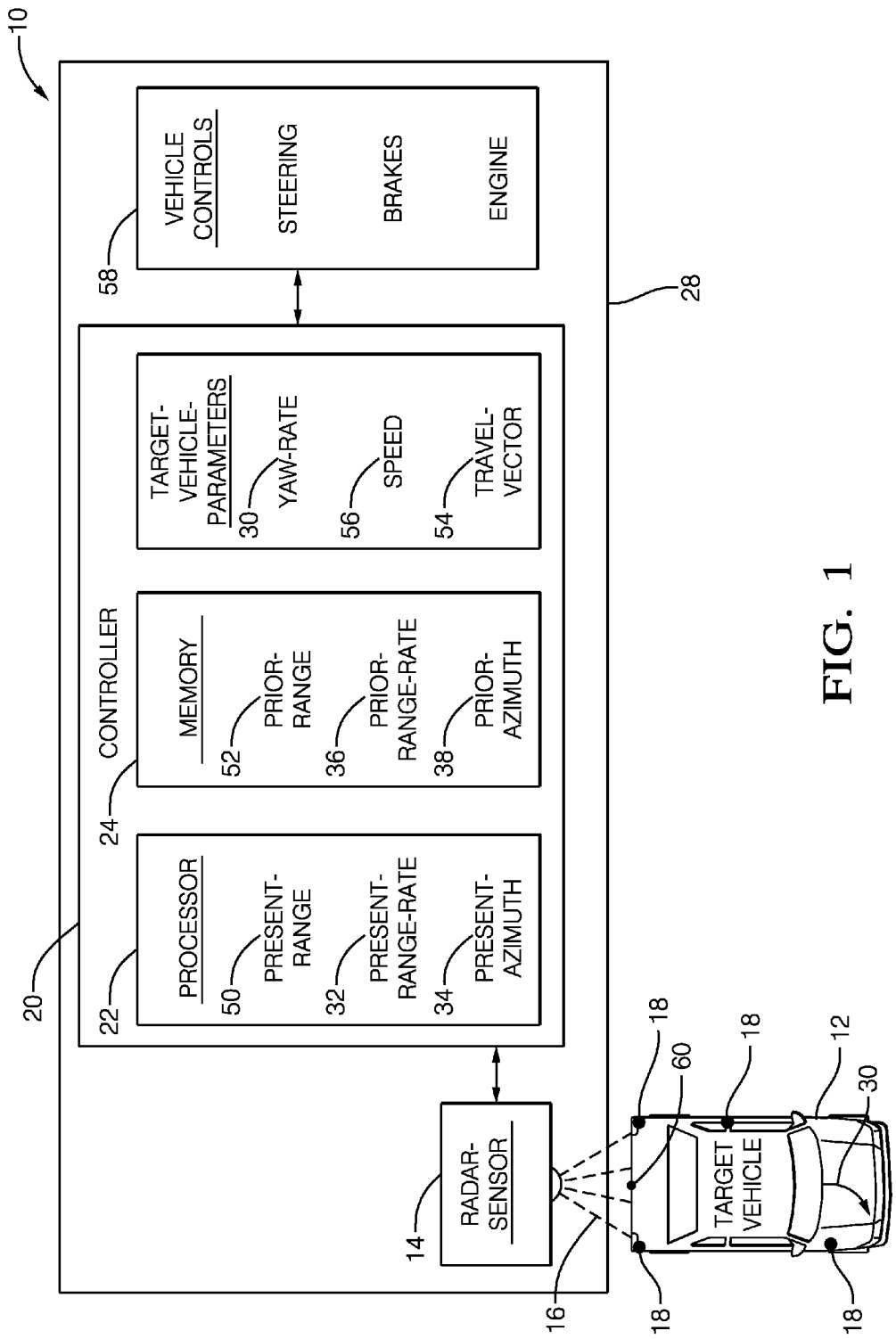
FIG. 1 is a diagram of a radar system suitable for an automated vehicle in accordance with one embodiment.

FIG. 1 illustrates a non-limiting example of a radar system 10, hereafter the system 10, which is suitable for operating an automated vehicle, such as a host-vehicle 28. While the description of the system 10 presented herein is generally directed to a fully-automated (i.e. autonomous) vehicle, it is contemplated that the teachings presented herein are applicable to partially automated vehicles that may momentarily take-over control of the host-vehicle 28 or momentarily assist the an operator (not shown) with manually steering the host-vehicle 28 to, for example, avoid another vehicle such as a target-vehicle 12 traveling or located proximate to, e.g. in front of, the host-vehicle 28.

The system 10, or more specifically the host-vehicle 28, is equipped with a radar-sensor 14 mounted on a host-vehicle 28. The radar-sensor 14 is operable to detect the radar-signals 16 reflected by scattering-points 18 of the target-vehicle 12. As used herein, a scattering-point may be generally characterized as a feature on the target-vehicle 12 that reflects enough radar-signal energy to be distinguishable from other instances of the scattering-points 18 detected by the radar sensor 14. For example, a scattering-point may be a license-plate, a tail-light housing, a side-view minor assembly, a wheel, a substantive portion of the frame of the target-vehicle 12, as will be recognized by those in the art. That is, the radar-sensor 14 may detect multiple instances of the scattering-points 18 from distinct locations on the target-vehicle 12. When multiple scattering-points from a single object (e.g. the target-vehicle 12) are detected, such objects are sometimes referred to as 'extended targets'.

The system 10 also includes a controller 20 in communication with the radar-sensor 14. The controller 20 may include a processor 22 such as a microprocessor or other control circuitry such as analog and/or digital control circuitry including an application specific integrated circuit (ASIC) for processing the data 26 from the radar-sensor 14, as should be evident to those in the art. The controller 20 may include memory 24, including non-volatile memory, such as electrically erasable programmable read-only memory (EEPROM) for storing one or more routines, thresholds, and captured data. The one or more routines may be executed by the processor 22 to perform steps for determining, for example, a yaw-rate 30 of the target-vehicle 12 based on the radar-signals 16, as will be described in more detail below.

The controller 20 is generally configured to execute a process that determines characteristics of movement by the target-vehicle 12 such as the yaw-rate 30 of the target-vehicle 12 relative to the ground over which the target-vehicle 12 travels. The process may be summarized in three general steps that include: a step to determine, using the processor 22, a present-range-rate 32 and a present-azimuth 34 of each of the scattering-points 18 detected by the radar-sensor 14 at a present-time (k); a step to recall from the memory 24 a prior-range-rate 36 and a prior-azimuth 38 of each of the scattering-points 18 at a prior-time (k−1); and a step to calculate, using the processor 22, the yaw-rate 30 of the target-vehicle 12 at the present-time (k) based on the present-range-rate 32, the present-azimuth 34, the prior-range-rate 36, and the prior-azimuth 38 of each of the scattering-points 18. Details of a non-limiting example of this process will be described later.

Figure 2:
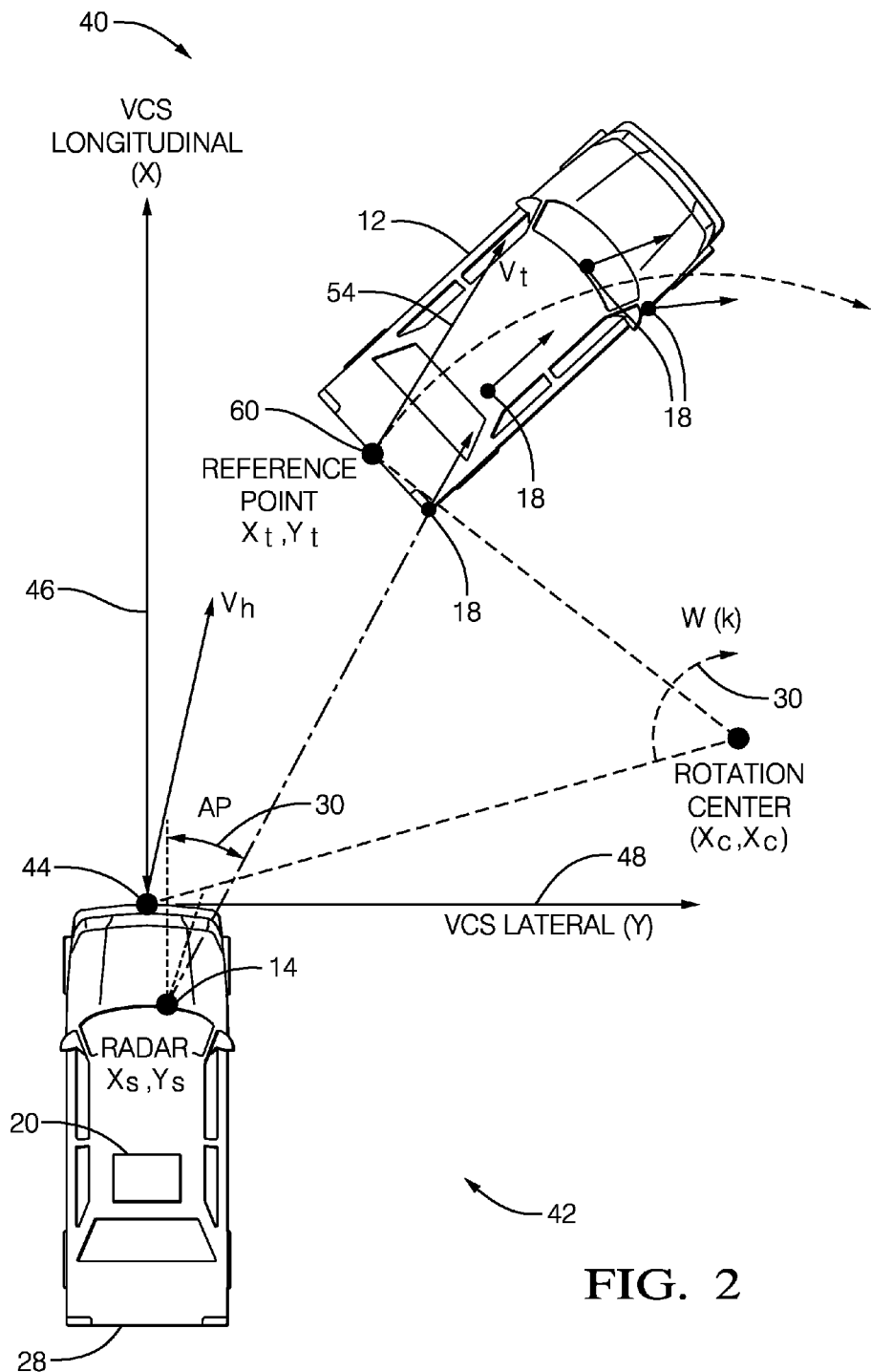
FIG. 2 is a traffic scenario experienced by the system of FIG. 1 in accordance with one embodiment.

FIG. 2 illustrates a non-limiting example of a traffic scenario 40 where the coordinate reference frame for the system 10 is referenced to the host-vehicle 28, which may be a vehicle coordinate system, hereafter the VCS 42. The VCS 42 is fixed relative to the host-vehicle 28 with an origin 44 of the VCS 42 located at the center of the front bumper of the host-vehicle 28. In this example, the x-axis 46 of the VCS 42 is parallel to a longitudinal-axis (forward for increasing values of 'x') of the host-vehicle 28, and a y-axis 48 is orthogonal to the x-axis 46, i.e. parallel to a lateral-axis of the host-vehicle 28 (starboard for increasing values of y).

Details of a non-limiting example of the process executed by the system 10, or more specifically by the controller 20 or the processor 22, will now be described starting with a Definitions of Variables.

1. k: sampling time index (i.e. the present time) for sampled instances of radar-signals or radar reflections.
2. T: sampling interval of the radar-sensor.
3. Vh(k)=[uh(k), vh(k)]: OTG velocity vector of the origin of the VCS on host-vehicle at time k, where the 'h' indicates 'host-vehicle', uh and vh are the velocity components of Vh that are parallel to the x-axis and y-axis of the VCS, respectively. It is assumed the host is moving all the time, i.e. Vh(k) is not equal [0, 0].
4. B(k): yaw-rate of the host-vehicle at time k.
5. Xs; Ys: x and y coordinates of the radar-sensor relative to the VCS. Since the radar-sensor is fixed on the host-vehicle, the values of Xs and, Ys are constant over time k.
6. Vs(k)=[us(k), vs(k)]: OTG velocity vector of the radar-sensor, where 's' is the indicator for "sensor".
7. Xt(k); Yt(k): x and y coordinates of a reference-point on the target-vehicle at time k and measured relative to the VCS. The 't' indicates 'target-vehicle'.
8. Vt(k)=[ut(k), vt(k)]: OTG velocity vector of the reference-point of the target-vehicle. ut and vt are the velocity components of Vt, and are parallel to the x-axis and y-axis of the VCS, respectively.
9. W(k): yaw-rate of target-vehicle at time k.
10. m(k), the number of scattering-points detected by the radar-sensor at time k.
11. Dp(i, k): distance to the $i^{th}$ scattering-point at time k measured by the radar-sensor. The 'p' indicates 'scattering-point'.
12. Rp(i, k): range-rate of the $i^{th}$ scattering-point at time k measured by the radar-sensor.
13. Ap(i, k): azimuth to the $i^{th}$ scattering-point at time k measured by the radar-sensor.
14. Xp(i, k); Yp(i, k): x and y coordinates of the $i^{th}$ scattering-point at time k, calculated from Dp(i, k) and Ap(i, k).
15. Vc(k)=[uc(k), vc(k)]: OTG velocity vector of the radar-sensor if the host-vehicle is turning concentrically with the target-vehicle (i.e., they have the same center-point of rotation) and with the same yaw-rate as the target-vehicle.

In one embodiment the controller is configured to determine or compute the yaw-rate 30 (W) based on range-rate (Rp) and Azimuth (Ap), together with the host and the sensor velocities and host yaw-rate. That is, the controller 20 may use only values for the present-range-rate 32, the present-azimuth 34, the prior-range-rate 36, and the prior-azimuth 38 to determine, recursively, the yaw-rate 30 (W) of the target-vehicle 12 at each time k. The 'state' of the target-vehicle at time k may be characterized by s(k)=[uc(k), vc(k), W(k)], where W(k) is the yaw-rate, and uc(k) and vc(k) are two auxiliary variables defined above. Since the yaw-rate W(k) is included in s(k), once s(k) is computed, the yaw-rate W(k) can be determined from s(k).

P(k) is defined as a mean-square error matrix of s(k). It is a 3-by-3 positive definite matrix. s(k) and P(k) are calculated or determined at each radar scan, i.e. when radar measurements at each time k are received by the controller. Since radar signals are used to estimate s(k), and radar measurement are not perfect because of noise and/or bias, the estimated s(k) also has some (unknown) error to the (unknown) truth. This P(k) reveals how large is the error in s(k). In other words, P(k) can be intuitively understood as a confidence measure for s(k). That is, P(k) indicates how accurate or how confident is the estimated s(k). The larger the P(k), the less accurate/confident the s(k). The value of P(0) for initialization may be predetermined. Subsequent values of P(k) (e.g. P(1), P(2) . . . ) will be iteratively computed by the controller. Relatively large values may be established in P(0) since s(0) is usually some guess, and a large P(0) indicates that there is not much confidence on this initial guess for s(0). Later, in each loop of the algorithm executed by the controller, both s(k) and P(k) will be computed based on s(k−1) and P(k−1), and it is expected that each subsequent value of P(k) will get smaller and converge to some acceptable value.

The controller uses an iterative or recursive technique to determine the yaw-rate W(k) at each instance in time k. That is, as new measurements for the range-rate and azimuth of the scattering-centers are received by the controller at time k, the yaw-rate W(k) is determined based on the new measurements and the previous results, s(k−1). A non-limiting example of steps to determine the yaw-rate W(k) are now described.

Step 1: (Initialization) At time k=0, before any radar-returns are processed, the values of s(0) and P(0) are initialized. For example, s(0) may be initialized to be [uh(0), vh(0),0] indicating that the target-vehicle is traveling at the same speed and direction as the host-vehicle, e.g. straight, so the yaw-rate W(0)=0.

Step 2: Assume that the values of s(k−1) and P(k−1) have been obtained from the iterative process described in the steps below.

Step 3: At time k, when new radar measurements (i.e., range-rate Rp(i; k) and azimuth angle Ap(i; k)) are determined for all of the scattering-points detected, the following variables are calculated by Eqs. 1-3:

$$ (C(k-1)) = \begin{pmatrix} \cos[T*B(k-1)] & -\sin[T*B(k-1)] \\ \sin[T*B(k-1)] & \cos[T*B(k-1)] \end{pmatrix}, \quad \text{Eq. 1} $$

$$ \Delta x(k-1) = (mag[Vh(k-1)]/B(k-1)) * \sin[T*B(k-1)]), \quad \text{Eq. 2} $$

$$ \Delta y(k-1) = (mag[Vh(k-1)]/B(k-1)) * (1 - \cos[T*B(k-1)]), \quad \text{Eq. 3} $$

where C(k−1) is a coordinate-rotation-matrix that indicates rotation of the coordinate reference frame for the system is the host-vehicle, i.e. rotation of the vehicle coordinate system (VCS) due to yaw motion of the host-vehicle during the time interval from time k−1 to time k, and [Δx(k−1) Δy(k−1)]', hereafter expressed as tran[Δx(k−1) Δy(k−1)]' to denote a matrix transpose, is a 2×1 column matrix or vector that indicates a change in position of the host-vehicle from time k−1 to time k due to longitudinal/lateral motion of the host-vehicle. The mag[Vh(k−1)] is the magnitude of Vh(k−1), i.e. the speed of the host-vehicle, which may alternatively be indicated by ‖Vh(k−1)‖. Eqs. 2 and 3 can be computed based on a Taylor Series Expansion of the Sine and Cosine functions at point zero, so that numerical problem can be avoided when B(k−1) is close to zero.

Then, using C(k−1), Δx(k−1) and Δy(k−1) from the above equations, Ap(i, k) from the radar-returns of the plurality of scattering-points, and knowing the location the radar-sensor location Xs and Ys, calculate a state-dynamic matrix, F(k−1). F(k−1) characterizes how the state, s(k−1), evolves over time. That is, if the state at time k−1, i.e., s(k−1), is known, then without any new radar data, a prediction of the state at time k can be made using s(k|k−1)=F(k−1)*s(k−1), where "k|k−1" is used to indicate that a prediction is being made. F(k−1) may be expressed as Eq. 4:

$$ (F(k-1)) = \begin{pmatrix} C(k-1) & C(k-1)*tran[-\Delta y(k-1) \Delta x(k-1)] \\ 0 & 1 \end{pmatrix}. \quad \text{Eq. 4} $$

A measurement matrix H(k) is also defined for subsequent calculations as Eq. 5:

$$ (H(k)) = \begin{pmatrix} \cos[Ap(1,k)] & \sin[Ap(1,k)] & Xs*\sin[Ap(1,k)] - Ys*\cos[Ap(1,k)] \\ \cos[Ap(2,k)] & \sin[Ap(2,k)] & Xs*\sin[Ap(2,k)] - Ys*\cos[Ap(2,k)] \\ \vdots & \vdots & \vdots \\ \cos[Ap(m(k),k)] & \sin[Ap(m(k),k)] & Xs*\sin[Ap(m(k),k)] - Ys*\cos[Ap(m(k),k)] \end{pmatrix}. \quad \text{Eq. 5} $$

Given s(k−1), P(k−1), F(k−1), and H(k), a prediction of s(k), i.e. a prediction of the 'state' of the target-vehicle, denoted herein as s(k|k−1), and the error matrix, P(k|k−1), at time k may be made from information from time k−1 and expressed, respectively, as Eqs. 6-7:

$$ s(k|k-1)=F(k-1)*s(k-1) \quad \text{Eq. 6,} $$

$$ P(k|k-1)=(F(k-1)*P(k-1)*tran[F(k-1)])+Q(k) \quad \text{Eq. 7,} $$

where Q(k) is a 3×3 positive definite parameter matrix subjected to tuning or calibration for the particular configuration of the radar system. Also, predict synthetic measurement h(k|k−1)=H(k)*s((k|k−1).

Step 4: Based on the radar measurement (azimuth Ap(I, k) and range-rate Rp(I, k)) and the velocity of the radar-sensor 14 at time k, compute the following synthetic measurement in Eq. 8:

$$ (h(k)) = \begin{pmatrix} Rp(1,k) + us(k)*\cos[Ap(1,k)] + vs(k)*\sin[Ap(1,k)] \\ Rp(2,k) + us(k)*\cos[Ap(2,k)] + vs(k)*\sin[Ap(2,k)] \\ \vdots \\ Rp(m(k),k) + us(k)*\cos[Ap(m(k),k)] + vs(k)*\sin[Ap(m(k),k)] \end{pmatrix}, \quad \text{Eq 8} $$

and based on H(k) and P(k|k−1) from Step 3 compute Eqs. 9 and 10:

$$ N(k)=(H(k)*P(k|k-1)*tran[H(k)])+R(k) \quad \text{Eq. 9, and} $$

$$ G(k)=P(k|k-1)*tran[H(k)]*inv[N(k)] \quad \text{Eq. 10,} $$

where 'inv' means matrix inversion, and R(k) is a m(k)-by-m(k) positive definite parameter matrix dependent on radar performance.

Based on h(k), G(k), and N(k) from the above equations, s(k) is updated by Eqs. 11 and 12

$$ s(k)=s(k|k-1)+(G(k)*(h(k)-h(k|k-1)) \quad \text{Eq. 11,} $$

$$ P(k)=(((I-G(k)*H(k))*P(k|k-1))*tran[I-G(k)H(k)])+ \\ (G(k)*R(k)*tran[G(k)]) \quad \text{Eq. 12,} $$

where I is a 3-by-3 identity matrix. From Eq. 11, the state s(k) is computed based on the difference between the synthetic measurement h(k) and the predicted synthetic measurement h(k|k−1). These two synthetic variables, i.e., h(k) and h(k|k−1), set up a simple connection between the target-vehicle yaw-rate and the radar detections (i.e., range-rate and azimuth). Ideally, these two variables should be equal. Hence, their actual difference provides information about how to update s(k) from s(k−1). Note that the mathematical relationship between the target yaw-rate and raw radar detections are not obvious to identify, not to mention how to infer the target yaw-rate from radar range-rate and azimuth. The difficulty is that the unknown locations of all the scattering-points are needed in the derivation and advanced effort is required to finally remove all these unknown locations of the scattering-points from Eqs. 5 and 8. Otherwise it may be difficult to estimate the yaw-rate with all these unknown locations of the varying scattering-points in the algorithm. The term "synthetic measurement" is used because it is the "processed" information based on the raw radar detections, so that the mathematical relationship between the target yaw-rate and raw radar detections can be readily revealed.

In an alternative embodiment, the controller 20 may additionally use values for a present-range 50 and a prior-range 52 in addition to the previously used values (the present-range-rate 32, the present-azimuth 34, the prior-range-rate 36, and the prior-azimuth 38) to determine, recursively, the yaw-rate 30 of the target-vehicle 12 at each time k. Incorporating a range (i.e. distance) measurement makes the process or algorithm more robust. In the description above it was assumed that the yaw-rate was relatively constant. However, if the assumption is that the yaw-rate is not constant, if the yaw-rate occasionally jumps for example, configuring the controller as described below to includes range data to the calculations provides better performance than is the case for the algorithm described above.

Step 1: Define the target state (s(k)) for each time k as Eq. 13:

$$s(k)=\text{tran}[Xt(k),\ Yt(k),\ uc(k),\ vc(k),\ W(k)] \quad \text{Eq. 13}$$

where uc(k) and vc(k) are defined above. Note that since s(k) is now a 5-by-1 vector, the mean-square error matrix (MSE) of s(k), P(k), is a 5-by-5 positive definite matrix.

Step 2: Set the initial value of s(0) and P(0) to start the algorithm.

Step 3: At time k−1, assume s(k−1) and P(k−1) have been computed based on the range (distance), range-rate and azimuth up to time k−1.

Step 4: When new radar measurement arrive at time k. First, the following function f(g,k), where g=[a1,a2,a3,a4, a5] is constructed which is the first input vector, where a1,a2,a3,a4 and a5 are the components in this vector, and time instance k is its second input. The function f equals f(g,k)=tran[Tao(g,k), Epi(g,k), a5], where Tao and Epi are determined in Eqs. 14-15:

$$Tao(g,k) = C(k) * \begin{pmatrix} a1*\cos[a5*T] - a2*\sin[a5*T] + a3*\sin[a5*T]/a5 - a4*\dfrac{(1-\cos[a5*T])/}{a5 - \Delta x(k)} \\ a1*\sin[a5*T] + a2*\cos[a5*T] + a3*(1-\cos[a5*T])/a5 + \dfrac{a4*\sin[a5*T]/}{a5 - \Delta y(k)} \end{pmatrix} \quad \text{Eq. 14}$$

and $$Epi(g,k) = C(k) * \begin{pmatrix} a3 - a5*\Delta y(k) \\ a4 + a5*\Delta x(k) \end{pmatrix} \quad \text{Eq. 15}$$

where C(k), Δx and Δy are given in Eqs. 1 and 2.

Once f(g,k) function is constructed, a partial derivative of that function is evaluated in Eq. 16:

$$F(k-1) = \dfrac{\partial f}{\partial g}(s(k-1), k-1), \quad \text{Eq. 16}$$

which is a state dynamic matrix (similar to the F matrix in the previous section).

Then a measurement matrix H(k) is computed by Eq. 17:

$$(H(k)) = \begin{pmatrix} 1 & 0 & 0 & 0 & 0 \\ 0 & 1 & 0 & 0 & 0 \\ 0 & 0 & \cos[Ap(1,k)] & \sin[Ap(1,k)] & Xs*\sin[Ap(1,k)] - Ys*\cos[Ap(1,k)] \\ 0 & 0 & \cos[Ap(2,k)] & \sin[Ap(2,k)] & Xs*\sin[Ap(2,k)] - Ys*\cos[Ap(2,k)] \\ \vdots & \vdots & \vdots & \vdots & \vdots \\ 0 & 0 & \cos[Ap(m(k),k)] & \sin[Ap(m(k),k)] & Xs*\sin[Ap(m(k),k)] - Ys*\cos[Ap(m(k),k)] \end{pmatrix} \quad \text{Eq. 17}$$

Once F(k−1) and H(k) are obtained, a prediction similar to that describe in the previous section is determined by Eqs. 18-20:

$$s(k|k-1)=F(k-1)*s(k-1) \quad \text{Eq. 18,}$$

$$P(k|k-1)=(F(k-1)*P(k-1)*\text{tran}[F(k-1)])+Q(k) \quad \text{Eq. 19, and}$$

$$h(k|k-1)=H(k)*s(k|k-1) \quad \text{Eq. 20.}$$

Note since the state is 5-by-1 vector, here Q(k) also becomes a 5-by-5 tuning parameter matrix.

Step 5: Based on the radar measurement (range, range-rate and azimuth) and the velocity of the host vehicle at time k, Eqs. 21-22 compute the following variables:

$$p(k)=\min\{i\}\ [Dp(i,k)*\cos[Ap(i,k)] \quad \text{Eq. 21,}$$

$$q(k)=(\text{sum}\{1\text{ to }m(k)\}[Dp(i,k)*\sin[Ap(i,k)]])/m(k) \quad \text{Eq. 22,}$$

where 'min' is the 'minimum-function', so p(k) indicates the nearest longitudinal distance (i.e., distance along x-axis of VCS) of the scattering points 18, and 'sum' is the summation-function, so q(k) indicates the average lateral distance (i.e., distance along y-axis of VCS) of the scattering points 18, such that p(k) and q(k) are a synthetic pseudo-measurement for the position of a reference-point 60 of the target-vehicle 12.

Then, based on the above results, radar measurement, and velocity (Vs) of the radar-sensor 14, the synthetic measurement is calculated in Eq. 23:

$$(h(k)) = \begin{pmatrix} p(k) \\ q(k) \\ Rp(1,k) + us(k)*\cos[Ap(1,k)] + vs(k)*\sin[Ap(1,k)] \\ Rp(2,k) + us(k)*\cos[Ap(2,k)] + vs(k)*\sin[Ap(2,k)] \\ \vdots \\ Rp(m(k),k) + us(k)*\cos[Ap(m(k),k)] + vs(k)*\sin[Ap(m(k),k)] \end{pmatrix} \quad \text{Eq. 23}$$

Then, based on H(k) and P(k|k−1) from Step 4, compute Eq. 24-25:

$$N(k)=(H(k)*P(k|k-1)*\text{tran}[H(k)])+R(k) \quad \text{Eq. 24, and}$$

$$G(k)=P(k|k-1)*\text{tran}[H(k)]*\text{inv}[N(k)] \quad \text{Eq. 25.}$$

Similarly, R(k) is a positive definite parameter matrix dependent on radar performance. Based on h(k), G(k), and N(k) from the above equations, s(k) is updated by Eq. 26-27

$$s(k)=s(k|k-1)+(G(k)*(h(k)-h(k|k-1))) \quad \text{Eq. 26,}$$

$$P(k)=\{((I-G(k)*H(k))*P(k|k-1))*\text{tran}[I-G(k)H(k)]\}+ (G(k)*R(k)*\text{tran}[G(k)]) \quad \text{Eq. 27,}$$

where I is a 5-by-5 identity matrix in this case.

Step 6: The velocity Vt(k) of the reference-point 60 can be computed by Eqs. 28-29:

$$ut(k)=uc(k)-Yt(k)*W(k) \quad \text{Eq. 28,}$$

$$vt(k)=vc(k)+Xt(k)*W(k) \quad \text{Eq. 29,}$$

So for this algorithm, not only the yaw-rate 30, but also a target-velocity or a travel-vector 54 and/or a speed 56 of the target-vehicle 12 can be estimated.

Step 7, this completes a cycle and loop back to step 3 for next time instance k+1.

Referring again to FIG. 1, knowledge of the yaw-rate 30 (W) and/or the travel-vector 54 (Vt) may be used by the controller to operate the vehicle-controls 58 of an automated vehicle (e.g. the host-vehicle 28) to better control the host-vehicle 28 for ride quality because the future position and/or actions of the target-vehicle 12 can be predicted.

Accordingly, a radar system suitable for an automated vehicle (the system 10), a controller 20 for the system 10 and a method or process for operating the system 10 is provided. Accurate knowledge of the yaw-rate and velocity of the target-vehicle is important for many active safety features in driver assistance system and autonomous vehicle system, e.g., automated emergency brake (AEB) function and adaptive cruise control (ACC) function. Quick and accurate estimation of target-vehicle yaw-rate and velocity is the foundation for target-vehicle path prediction, e.g., helps decide whether the target-vehicle is turning out of the host path or it is cutting into the host lane. This information is crucial for proper function of AEB and ACC.

While this invention has been described in terms of the preferred embodiments thereof, it is not intended to be so limited, but rather only to the extent set forth in the claims that follow.

We claim:
1. A radar system suitable for an automated vehicle, said system comprising:
   a radar-sensor mounted on a host-vehicle, said radar-sensor operable to detect radar-signals reflected by scattering-points of a target-vehicle located proximate to the host-vehicle; and
   a controller in communication with the radar-sensor, said controller configured to
   determine a present-range-rate and a present-azimuth of each of the scattering-points at a present-time,
   recall a prior-range-rate and a prior-azimuth of each of the scattering-points at a prior-time, and
   calculate a yaw-rate of the target-vehicle at the present-time based on the present-range-rate, the present-azimuth, the prior-range-rate, and the prior-azimuth of each of the scattering-points.

2. The system in accordance with claim 1, wherein the controller is further configured to
   determine a present-range of each of the scattering-points at a present-time,
   recall a prior-range of each of the scattering-points at a prior-time, and
   calculate a yaw-rate of the target-vehicle at the present-time based on the present-range, the present-range-rate, the present-azimuth, the prior-range, the prior-range-rate, and the prior-azimuth of each of the scattering-points.

3. A radar system suitable for an automated vehicle, said system comprising:
   a radar-sensor mounted on a host-vehicle, said radar-sensor operable to detect radar-signals reflected by scattering-points of a target-vehicle located proximate to the host-vehicle; and
   a controller in communication with the radar-sensor, said controller configured to
   determine a present-range, a present-range-rate, and a present-azimuth of each of the scattering-points at a present-time,
   recall a prior-range, a prior-range-rate, and a prior-azimuth of each of the scattering-points at a prior-time, and
   calculate a yaw-rate of the target-vehicle at the present-time based on the present-range, the present-range-rate, the present-azimuth, the prior-range, the prior-range-rate, and the prior-azimuth of each of the scattering-points.

* * * * *